United States Patent [19]
Szekessy

[11] 3,740,715
[45] June 19, 1973

[54] CIRCUIT SYSTEM FOR BRAKE LIGHTS

[75] Inventor: Istvan Szekessy, Munich, Germany

[73] Assignee: Rexroth Und Szekessy Entwicklung GmbH, Munich, Germany

[22] Filed: Oct. 18, 1971

[21] Appl. No.: 190,071

[30] Foreign Application Priority Data
Mar. 15, 1971 Germany.................. P 21 12 391.1
Oct. 19, 1970 Germany.................. P 20 51 245.2

[52] U.S. Cl. ............ 340/72, 307/293, 315/200 A, 331/111
[51] Int. Cl................................................ B60q 1/44
[58] Field of Search ............. 340/67, 71, 72, 81 R, 340/81 F

[56] References Cited
UNITED STATES PATENTS

| | | |
|---|---|---|
| 3,329,868 | 7/1967 | Domann et al............. 340/81 R UX |
| 3,382,405 | 5/1968 | Johnson........................... 340/331 X |
| 3,422,421 | 1/1969 | Moller et al. ................. 340/81 R X |
| 3,444,515 | 5/1969 | Hayden......................... 340/81 R X |
| 3,576,527 | 4/1971 | Howard ............................... 340/67 |
| 3,629,820 | 12/1971 | Sakurai................................. 340/72 |
| 3,633,160 | 1/1972 | Paffrath et al....................... 340/72 |

*Primary Examiner*—John W. Caldwell
*Assistant Examiner*—Kenneth N. Leimer
*Attorney*—Eugene J. Kalil and Sandoe, Hopgood & Calimafde

[57] ABSTRACT

A circuit system for brake lights comprising a brake light modulator incorporated in the circuit which includes brake lights, a switch and voltage source, the modulator being made operational for a defined modulation period when the switch is closed and being adapted to repeatedly vary the illumination intensity of the brake lights.

10 Claims, 8 Drawing Figures

Patented June 19, 1973     3,740,715

Patented June 19, 1973

CIRCUIT SYSTEM FOR BRAKE LIGHTS

The invention relates to a circuit system for brake lights of motor vehicles or the like in which the brake light may be connected to a voltage supply through a switch actuated by the brake pedal.

A circuit system of this kind is already broadly known. Its purpose is to provide optical information to the road user behind the braking vehicle that the vehicle is in process of braking so that the driver of a vehicle disposed behind the braking motor vehicle may take the necessary action and, for example, operate the brake pedal in his vehicle or commence a diversionary maneuver. The brake lights are automatically illuminated when the brake pedal is actuated so that the driver of the braking motor vehicle need not separately switch on a switch for operating the brake light.

Since motor vehicles are provided at the rear not only with brake lights but also with other lights, for example, rear lights which are switched on in darkness or in poor visibility, both lights have been provided with different colors to differentiate between brake lights and rear lights, for example, by arranging for the brake lights to be illuminated in an amber color tone while the other rear lights are illuminated in a red color tone. Moreover, in order to provide better recognition of brake lights, they are operated with a higher illumination intensity than rear lights so that braking can be very clearly signalled to the road user disposed behind the braking vehicle. However, since the prior art also discloses rear lights with a very high illumination intensity, for example for travelling in fog, it follows that the effect of differentiated illumination intensity is often once again reduced.

The prior art as already known discloses circuit systems to reduce the risk of rearward collision, such systems making use of optical means in order to clearly indicate braking to the driver travelling behind the vehicle which is braking. For example, it is known for a greater or lesser number of brake lights, disposed as a light cluster, to be switched-on, relative to the degree of deceleration. However, the costs are very high. It is also known to convert the degree of deceleration into the operating frequency of a known switch, provided with negative temperature coefficient conductors for the rhythmic switching off of the electric brake light circuit; frequency changes, in particular continuous frequency changes, do not however, represent a very clear optical signal. It is also known for electromechanical or electronic circuits to cause the brake lights to flash during the entire braking operation, and, to this end, in particular, having the right-hand brake light illuminated when the left-hand brake light is extinguished and vice versa. The continuous flashing is undesirable, particularly in view of the modern system of flashing parking lights. The prior art also discloses circuit systems in which particularly high degrees of acceleration are additionally optically indicated.

In order to have simple means for counteracting the risk of rearward collision accidents, it is the object of the invention to signal the braking operation even more clearly to a road user positioned behind a braking motor vehicle.

According to the invention, this problem is solved in that a brake light modulator is incorporated into the circuit comprising the brake lights, switch and voltage source, the said modulator becoming operational for a defined modulation period when the switch is closed and being adapted to repeatedly vary the illumination intensity of the brake lights.

The function of the brake light modulator is to substantially vary the illumination intensity, the color tone or like signalling functions of the brake lights at the beginning of the braking operation and where appropriate under very heavy braking before the brake light is maintained in continuous illumination to the end of the braking operation so that the road user positioned behind the braking vehicle is better informed than hitherto by the fluctuating signalling functions regarding the beginning of deceleration of the vehicle. If the driver of a vehicle which follows a braking motor vehicle does not constantly observe the lights disposed on the rear of the preceding vehicle it was hitherto easily possible to overlook the moment at which the brake lights began to be illuminated. The sudden illumination of the brake lights, particularly in daylight and in good visibility, is a very distinct signal while the constant continuous illumination of the brake light is noted by the observer rather less readily. For example, if the brake lights are very brightly illuminated by incident sunlight, there is a risk that brake lights, having been switched on and emitting light at a continuous illumination intensity, are not noticed at all. Finally, there may be some doubt whether the preceding vehicle brakes or whether the driver of the said vehicle has merely switched on the rear lights at a time when the driver of the following vehicle has noticed the moment of switching on, that is to say, the illumination of the lights disposed on the rear of the preceding vehicle. Such difficulties do not occur when using the invention. In particular, repeated fluctuation of the illumination intensity when the brake lights are switched on is a distinct feature which differentiates against the moment of switching on the rear lights and remains a clear differentiating feature even if the brake lights are attenuated due to substantial sunlight illumination. Moreover, defining the modulation period with respect to time ensures that the initially mentioned disadvantages, relating to the prior art, do not occur. Modulation in the form of brightness modulation, color tone modulation or light modulation is limited according to the invention to the critical period and cannot therefore be mistaken with conventional flashing warning lights of stationary or moving traffic.

In order to signal the braking operation instantly as far as possible, it is appropriate for the brake light modulator to come into action immediately when the switch is closed so that the brake light modulator varies the illumination intensity of the brake light immediately and appropriately repeatedly, beginning with the bright phase. If the driver of the following vehicle overlooks the beginning of the braking operation and looks in the direction of the braking vehicle only a short time later, his attention will still be drawn to the brake lights since the illumination intensity thereof still fluctuates and they are not, as hitherto, continuously illuminated with a certain illumination intensity level.

The brake light modulator varies the voltage supplied to the brake lights in intervals and/or in waves. This action may be performed by a resistor being briefly connected into the circuit. It is also possible for the brake light circuit to be repeatedly interrupted, a function which may be performed by the brake light modulator through the switching on and off of a switch.

Particularly distinct signals will be obtained if the brake light modulator supplies the brake lights with brief voltage pulses, the peak values of which enable higher illumination intensities to be achieved than the illumination intensity in normal braking. Owing to the short period of the voltage pulses, there is no risk of the filaments of the brake lights or fuses of the appropriate circuit burning through. In this embodiment of the invention, it is appropriate for the duration of the voltage pulses with respect to their maxima, that is to say, the energy content comprising voltage and time, to be dimensioned in accordance with the load-bearing capacity of the filaments or fuses.

The modulation period appropriately begins with a positive voltage wave, pulse or the like and not with a negative voltage wave, pulse interval or the like since substantial differences in signalling means are noticed most rapidly and reliably. It is also advantageous in some cases for the amplitude of illumination intensity fluctuation to be varied during modulation. The modulation frequency is constant.

According to another embodiment of the invention, the previously described brake light modulator additionally comes into action with severe braking operation in that it modulates continuously during the entire time period for which severe braking is applied, in which case the modulation frequency may be equal to or different from the frequency of the initial modulation. A different amplitude may be used for modulation to indicate different modulation times, for example, beginning and severe braking.

In particular, this further embodiment of the invention incorporates a delay transmitter for the brake light modulator in which severe deceleration forces are accompanied by the motion of a mass beyond a limiting position, thus actuating a switch.

In this way, it is possible to signal to the road user positioned behind the vehicle, not only the beginning of a braking operation, namely by repeated, for example, different illumination of the brake lights, but also to transmit identical optical signals if the preceding motor vehicle brakes particularly severely. The following road user also benefits by his attention being drawn to the beginning of the braking operation of a preceding vehicle. In the sense of the above mentioned problem, it is also appropriate to specially draw the attention of the following road user if the preceding vehicle brakes particularly strongly since such severe braking is accompanied by a rapid reduction of the distance between the said vehicle and the following vehicle. The fact that a motor vehicle begins to brake particularly intensively within a braking period only after a certain period of time has elapsed after the beginning of the braking operation has frequently and for decades led to rear end collision accidents since the following road user often adjusts himself to decelerations at the beginning of the braking operation of the preceding vehicle but is not able to determine when the said vehicle brakes more intensively. This defect repeatedly leads to many rear end collision accidents without this said defect having been counteracted in a simple rather than in a costly manner.

In the above mentioned, known frequency modulated system in which the electric brake light circuit is switched off rhythmically, there is also a risk of mistakes with motor vehicles, the warning flashes of which are switched on and which are parked by the roadside. If a travelling motor vehicle increases its braking force and if this operates in accordance with the known brake modulation system, changing from slow flashing to more rapid flashing (with intensive braking operation) the frequency of the slow flashing will correspond approximately to the frequency of the warning flashers of a stationary motor vehicle. A road user travelling towards the hazard location is therefore not able to determine, at any rate from a substantial distance or in darkness, whether the motor vehicle disposed in front of him is stationary (slow flashing of the warning flashers) or is still travelling in the forward direction at a substantial speed (slow flashing which accompanies weak braking).

The invention avoids these disadvantages, in particular if the frequency at the beginning of the braking operation as well as in intensive braking operation remains the same and differs from the frequency of the warning flashers of stationary vehicles. It is, of course, possible for the frequency of the brake modulation of the circuit according to the invention to be approximately the same as that of warning flashers if differentiation between travelling and stationary vehicles is not necessary. Limitation of the modulation period, which may be adjustable, accompanied by light braking at any rate prevents constant modulation or the like over a prolonged period. Good differentiation between light braking (limited modulation period) and intensive prolonged braking (unlimited modulation period) is, however, simultaneously obtained by this method.

The invention may therefore be regarded as a tolerable warning system which operates with optimum reliability under practical conditions.

According to a further embodiment of the invention, it is appropriate for the limiting position at which the member responding to deceleration actuates the switch to be made adjustable or the switching time at which the brake modulator begins its action with incipient severe braking to be made adjustable. This adjustment will be frequently performed relative to the size and mass of the motor vehicle in which the circuit system according to the invention is incorporated.

Accordingly, it is also possible for the switch itself or for the coupling between the switch and the member to be constructed in adjustable form.

To the extent to which differentiation between incipient braking as such and intensive braking is to be made possible, it is advisable for the switching means to actuate the brake modulator so that it varies the illumination intensity of the brake lights with a frequency different from that associated with incipient braking. If intensive braking is followed by weaker braking, at which the delay transmitter is no longer in operation, it may also be advantageous if the initial modulation, limited with respect to time, once again follows the modulation of intensive braking.

Embodiments of the invention are explained hereinbelow by reference to the drawing in which.

Figure 1:
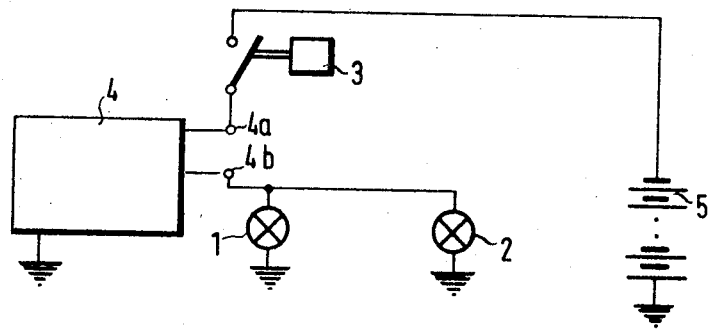
FIG. 1 is a schematic circuit diagram of a vehicle brake-light circuit into which a modulating system of the invention has been embodied.

In FIG. 1, a brake-light modulator 4 of the invention is connected at 4a–4b in series with brake lights 1–2 in the circuit comprising the said brake lights 1–2, the brake-pedal-operated switch 3, and the battery 5.

Figure 2:
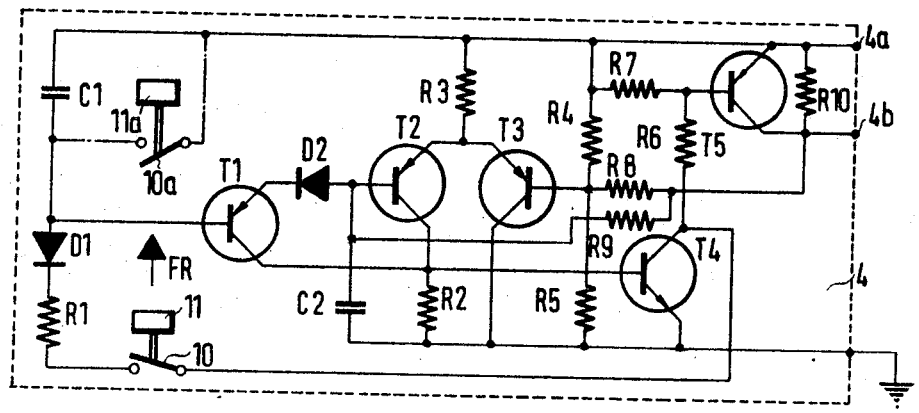
FIG. 2 is a more detailed circuit diagram to illustrate a unit-handling brake-light modulator package of the invention, the package being suggested by a dashed-enclosure.

In FIG. 2, the brake-light modulator is seen to comprise a transistorized module 4 which, as stated in connection with FIG. 1, is connected via terminals 4a–4b, between the brake lights 1–2 and the switch 3. The brake-light modulator 4 is shown ground-connected to the vehicle chassis.

Operation is as follows:

Operation of the brake pedal closes switch 3. Since the capacitor C2 will not as yet have any charge, the transistor T2 will become immediately conductive. It supplies the base current for the transistor T4 which switches on the transistor T5, said transistor allowing the required brake-light current to flow, so that the brake lights are energized at full intensity as soon as switch 3 is closed. A current will then flow across the resistor R8 to raise the base voltage of the transistor T3 to approximately 8 V, for the case of a 12 V battery 5. At the same time, the capacitor C2 will begin to be charged through the resistor R9 until the voltage at the base of the transistor T2 exceeds 8 V. This causes the transistor T2 to be driven to cut off.

Cut off of transistor T2 causes a current to flow in the reverse direction through resistor R8, and the base voltage at transistor T3 will then amount to approximately 4 V. Capacitor C2 will then once again be discharged, through resistor R9, until the voltage drops below 4 V. The transistor T2 will then once again be conductive, and the circuit will sweep back into the previously described state. The cycle duration of the sweep oscillation will be defined by the values of resistor R9 and capacitor C2.

The value of the resistor R10 will determine the minimum-intensity illumination level of brake lights 1–2, i.e., whether they are or are not illuminated, at intervals when transistor T5 is not switched on.

In an auxiliary or "latch" circuit, and whenever the brake lights 1–2 are switched on, the transistor T4 being conductive, a capacitor C1 will be charged in steps through a diode D1 and a resistor R1, until the base voltage at the transistor T1 amounts to approximately 6.5 V. Transistor T1 will then take up the base current of transistor T2 to prevent it being driven to cut off. Thereafter, and until switch 3 is opened, the circuit will remain in the steady state in which full current flows through the brake lights 1–2. The operating point of this "latch circuit" will be defined by the values of resistor R1 and capacitor C1, and the function of diode D2 is to admit current to transistor T1 in only one direction.

As a feature of the invention, intensive braking of the vehicle is detected and utilized to apply further modulating control to the brake-light circuit, at a switch 10. Switch 10 interrupts the auxiliary or "latch" circuit when a member, functioning as mass 11, is moved by intensive braking beyond a defined limiting position in the travelling direction FR, thus reinstating the described sweep oscillations, for as long as switch 10 remains closed; alternatively, as indicated by dot-dash line connections (FIG. 2), switch 10 may be replaced by a switch 10a, for example in parallel to capacitor C1, the said switch 10a being normally open and being closed only by the inertia of a body 11a, in the circumstance of a predetermined minimum deceleration.

Figure 3:
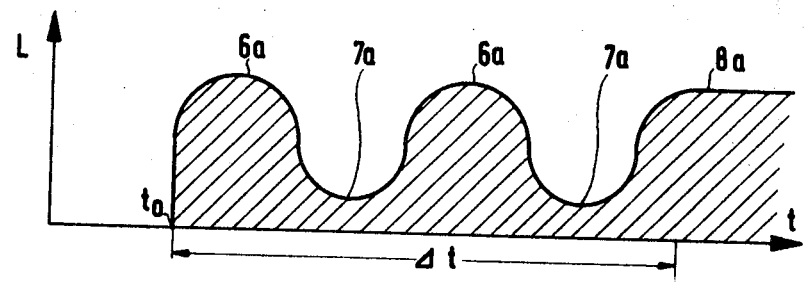
FIG. 3 is a diagram graphically illustrating an illumination-intensity time interval of the brake lights, for an operation of FIGS. 1 and 2.

FIG. 3 shows brake-light illumination intensity L plotted with respect to time $t$. The driver steps on the brake pedal at the time $t_0$, and brake lights 1–2 immediately begin to be illuminated. Upon reaching a first maximum illumination intensity 6a, the voltage across brake lights 1–2 once again drops, causing brake lights 1–2 to be illuminated at a reduced intensity, followed by a next maximum 6a, which is again followed by a next minimum 7a, and finally followed by continuous illumination at full illumination intensity 8a. Suitable selection of circuit constants enables selection of the number of illumination minima 7a to be defined, before establishment of the steady level 8a; for the case of a normal application of brakes, i.e., representing something less than intensive braking. This level 8a will remain until the pedal switch 3 is opened.

Figure 4:
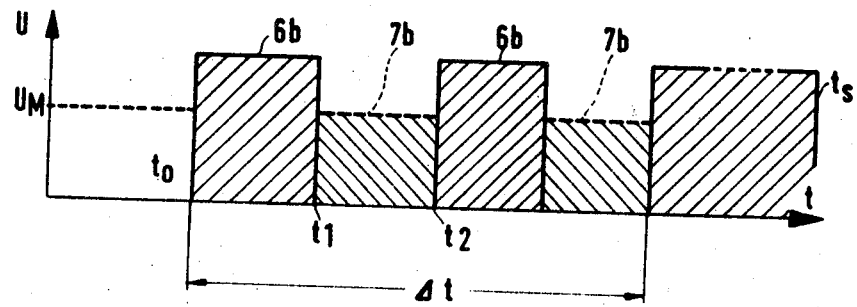
FIG. 4 is a similar diagram, illustrating the voltage-time relation for voltage supplied to the brake lights, and accounting for the illuminating-intensity situation of FIG. 3.

FIG. 4 shows brake-light voltage U plotted against time $t$, the maximum voltage 6b being applied to lights 1–2 at the switch-on instant $t_0$, i.e., when the brake pedal (with switch 3) is operated, and for a defined interval, to time $t_1$. The switch-on operation is represented by a square-wave pulse, in the interests of simplicity. At time $t_1$, the voltage drops from the voltage maximum 6b to the voltage minimum 7b until the brake light-modulator 4 automatically increases the voltage, at time $t_2$, to the voltage maximum 6b. This process is repeated several times, for the interval $\Delta t$. The voltage U may be either switched off entirely at the voltage minimum 7b or it may be set to a mean value $U_M$, depending upon the value selected for resistor R10. In general, it is advisable for the difference between the voltage maximum 6b and the voltage minimum 7b to be relatively great, for maximum visual response to the difference between illumination-intensity levels 6a–7a; and the use of dashed lines at $U_M$ and 7b will be understood to suggest the selectable feature. At time $t_s$, the brake pedal is once again released, and brake lights 1–2 are automatically switched off.

Figure 5:
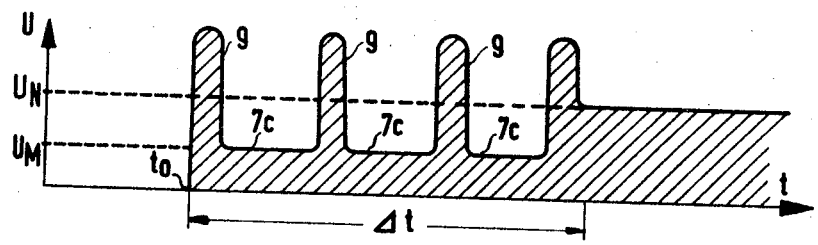
FIG. 5 is another such diagram, for a further voltage-time relation, accounting for an illumination-intensity situation as in FIG. 3.

FIG. 5 illustrates a modified pattern of voltage U applied to brake lights 1–2 as a function of time $t$. Normally, the brake lights 1–2 are excited t the normal voltage value $U_N$ when the brake pedal is operated. However, in the modification of FIG. 5, the brake-light modulator may also produce short-period voltage pulses 9 when being switched on, the peak values of said pulses substantially exceeding the normal voltage value $U_N$ without, however, causing the filaments of the brake lights 1, 2 or the fuses to burn through. The voltage applied between voltage pulses 9 to the brake lights 1, 2 may drop to a mean voltage value $U_M$, said value being substantially below the normal voltage value $U_N$. Sufficient signalling is also obtained if the normal voltage value $U_N$ is obtained at the voltage minima 7c provided the brake lights can sufficiently express the voltage difference between the voltage amplitude of the voltage pulse 9 and the voltage amplitude in the voltage minima 7c by virtue of their illumination intensity.

Figure 6:
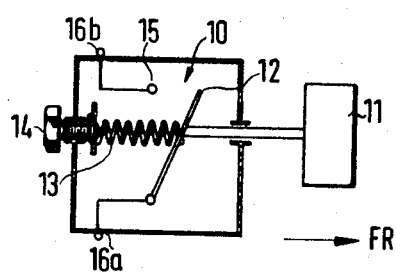
FIG. 6 is a simplified longitudinal sectional view of a delay or deceleration-responsive transmitter with switch, being a component of the FIG. 2 arrangement.

The switching means 10 according to FIG. 6 are shown merely in diagrammatic form. The mass 11, moved in the travelling direction FR during braking operation, is coupled through a rod to the switch contact bar 12 which, in turn, is coupled through a tension spring 13 to an adjusting screw 14, the purpose of which is to adjust the limiting position at which the contact bar 12 is lifted off the contact 15. The terminals 16a and 16b are disposed outside the switch.

Figure 7:
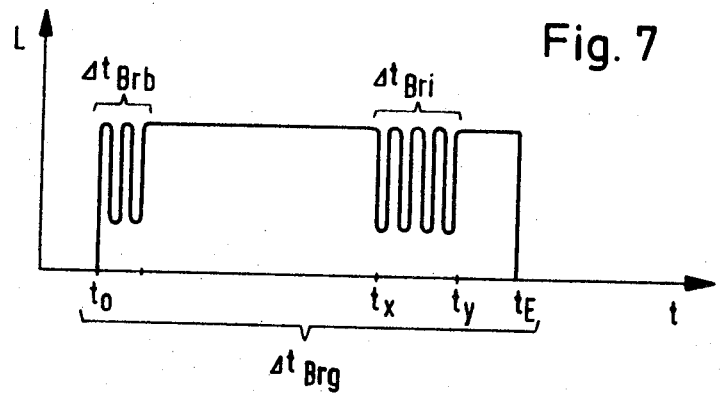
FIGS. 7 and 8 are further diagrams, for different illumination intensity-time intervals of the brake lights, to illustrate two different braking sequences.

The illumination intensity L of the brake lights is modulated in accordance with FIG. 7 not only at the beginning of the entire braking time $\Delta t_{Bra}$, that is to say, during the comencing braking time $\Delta t_{Brb}$, but also during the period of intensive braking $\Delta t_{Bri}$, this time being disposed between the times $t_x$ and $t_y$. The time $t_x$ corresponds to the limiting position at which the contact bar 12 may be lifted from the contact 15 and the time $t_y$ corresponds to the moment of time at which the contact bar 12 once again bears on the contact 15. At the beginning of the braking operation, the brake lights will be illuminated at the time $t_o$ and will be extinguished at the end of the braking operation at the time $t_E$. It may also be appropriate at the end of the time relating to intensive braking, namely $\Delta t_{Bri}$ for the initial modulation $\Delta t_{Brb}$, normally already available at the commencement of braking, to be immediately repeated.

Figure 8:
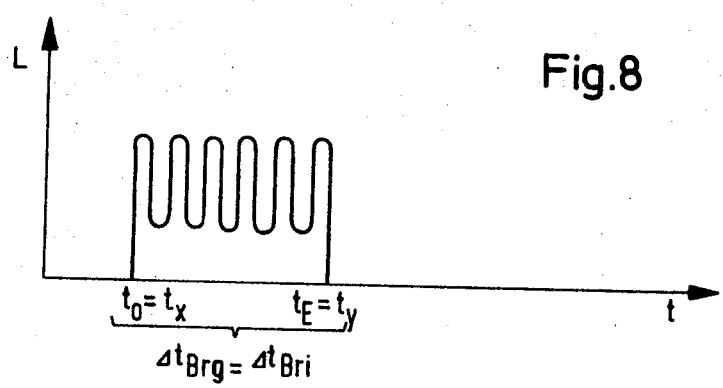

The illumination intensity according to FIG. 8 is modulated during the entire braking time $\Delta t_{Bra}$ since intensive braking takes place during this entire period of time. In this case, the time of intensive braking $\Delta t_{Bri}$ is at least partially superimposed on the time of comencing braking $\Delta t_{Brb}$.

Since the brake light modulator may be constructed as a small module, for example, in the form of a more or less integrated circuit, it is possible for the circuit system according to the invention to be subsequently fitted to conventional motor vehicles, in particular, since the switch, having a member which responds to deceleration, may also be subsequenyly installed. Incorporation into the conventional brake light circuit does not present any difficulty.

If the maximum possible deceleration obtained by the internal vehicle braking system has the value $-b_{max}$, it will be advantageous for the limiting position between normal and intensive braking to be set to approximately 50 percent of $-b_{max}$. Any other value may, of course, also be set if required.

Although the present invention has been described in conjunction with preferred embodiments, it is to be understood that modifications and variations may be resorted to without departing from the spirit and scope of the invention as those skilled in the art will readily understand.

What is claimed is:

1. In a motor-vehicle brake-light circuit system, a voltage-source input connection including brake-operated switch means, a brake-light output connection, and voltage-control means connecting said input and output connections; said control means including timing means connected to said input connection and responsive to actuation of said switch means to determine a given relatively short interval of time following an actuation of said switch means, a modulator of cyclic frequency producing a selected plurality of cycles of modulation of input voltage within said predetermined interval of time, said modulator being connected to supply modulated voltage to said output connection, means connected to said timing means for establishing steady-state connection of said input and output connections upon completion of the timed interval and as long as said switch means remains actuated, said control means further including inertially-operated means operative at detection of a predetermined magnitude of deceleration; said inertially-operated means being operatively connected, upon detection of said predetermined magnitude of deceleration, to effectively disable said steady-state connection and to maintain the modulated voltage connection to said output connection.

2. The system of claim 1, in which said inertially operated means is primarily unidirectionally responsive in the longitudinal direction of the motor vehicle.

3. The system of claim 1, in which said voltage-control means is connected in series with the brake lights.

4. As an article of manufacture for connection in a motor-vehicle brake-light circuit system, a unitary package including a voltage-source input connection having means for connection to brake-operated switch means, a brake-light output connection, and voltage-control means connecting said input and output connections; said control means including timing means connected to said input connection and responsive to excitation of said input connection to determine a given relatively short interval of time following an actuation of said switch means, a modulator of cyclic frequency producing a selected plurality of cycles of modulation of input voltage within said predetermined interval of time, said modulator being connected to supply modulated voltage to said output connection, means connected to said timing means for establishing steady-state connection of said input and output connections upon completion of the timed interval and as long as said switch means remains actuated, said control means further including inertially-operated means operative at detection of a predetermined magnitude of deceleration; said inertially-operated means being operatively connected, upon detection of said predetermined magnitude of deceleration, to effectively disable said steady-state connection and to maintain the modulated voltage connection to said output connection.

5. The article of claim 4, in which said inertially operated means is an inertially operated switch.

6. The article of claim 4, in which said modulator supplies output voltage modulated between maximum and minimum values above zero.

7. The article of claim 6, in which said maximum value is the same as the voltage-output level for said steady-state connection.

8. The article of claim 4, in which said inertially operated means includes means for selectively varying the predetermined magnitude of deceleration at which said inertially operated means is operative.

9. The article of claim 4, in which said modulator includes a switching transistor and an oscillator.

10. The article of claim 4, in which said inertially operated means is operative to effectively disable said steady-state connection only as long as it detects deceleration of at least said predetermined magnitude.

* * * * *